Dec. 19, 1950     E. J. W. VERWEY ET AL     2,534,390
CERAMIC INSULATING MATERIAL AND METHOD
OF MANUFACTURING SAME
Filed Jan. 31, 1947
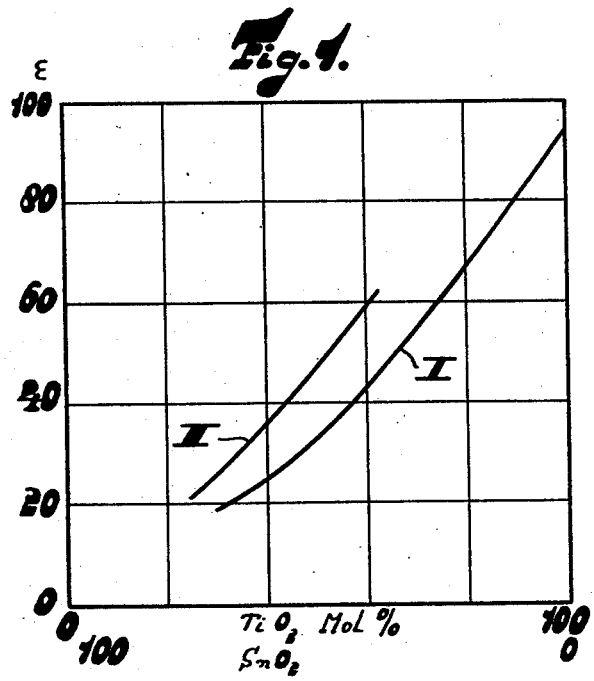
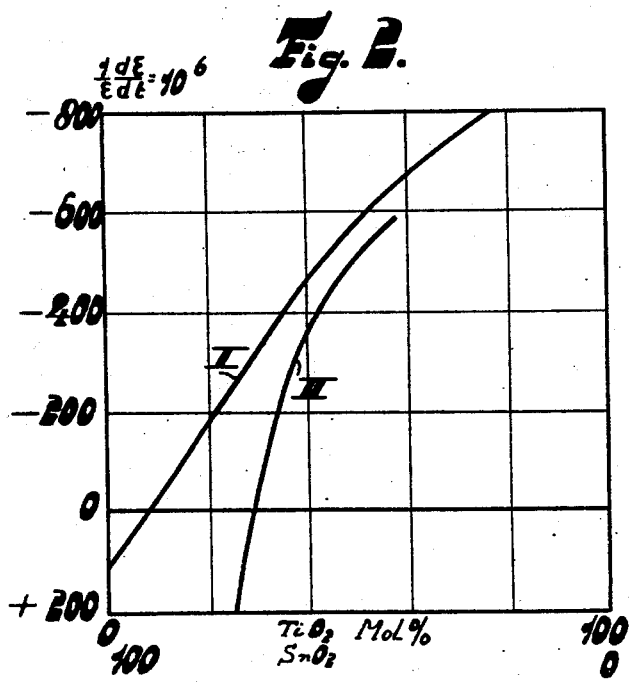
INVENTOR
E. J. W. VERWEY
J. M. STEVELS
BY
AGENT Patented Dec. 19, 1950

2,534,390

UNITED STATES PATENT OFFICE 2,534,390

CERAMIC INSULATING MATERIAL AND METHOD OF MANUFACTURING SAME

Evert Johannes Willem Verwey and Johannes Marinus Stevels, Eindhoven, Netherlands, assignors to Hartford National Bank and Trust Company, Hartford, Conn., as trustee Application January 31, 1947, Serial No. 725,558
In the Netherlands March 11, 1944

Section 1, Public Law 690, August 8, 1946
Patent expires March 11, 1964

4 Claims. (Cl. 106—39)

Sintered ceramic masses consisting of tin oxide and titanium dioxide have already been described whilst stating their dielectric properties (Zeitschrift für technische Physik 12, 1935; page 640–642). It has more particularly been pointed out, that tin oxide has a positive and titanium dioxide has a negative temperature coefficient of the dielectric constant, so that such mixtures permit the temperature coefficient to be adjusted to definite desired values. However, due to the high sintering temperature of the tin oxide it was not feasible, even when making use of a sintering agent, to sinter these mixtures to a sufficient degree of compactness, which evidently has been an impediment to their use in practice.

The invention consists in the use of a ceramic insulator, more particularly for a condenser dielectric, of a mass sintered to compactness, which is mainly built up of mixed crystals of tin oxide and titanium dioxide.

The invention is based on the recognition that in making the aforesaid known materials use was made of excessively pre-sintered tin oxide which, consequently, was insufficiently reactive.

According to the invention this evil is cured and the said products sintered to compactness can be obtained by making use of mixtures with reactive tin oxide. In accordance with their composition these mixtures can be sintered to compactness at temperatures below about 1500° C. If desired, the sintering temperature can be further reduced some-what by adding a sintering agent, which does not adversely affect the dielectric properties such as, for instance, $MgF_2$ or PbO.

The term "reactive tin oxide" as employed in the specification and the appended claims is to be understood to mean a stannic oxide which has been chemically produced and which has not been heated to a temperature exceeding 1000° C.

For example, "reactive tin oxide" can be precipitated from a solution of stannic sulfate with ammonia. To avoid excessive shrinkage during sintering, the tin oxide thus obtained is heated to about 700° C.

Alternatively, "reactive tin oxide" can be prepared from stannous oxide by heating the latter to about 700° C. in air.

The reactive tin oxide is mixed with titanium dioxide, which has been pre-heated to say 1100° C., and is ground together therewith. After that the mass is given the desired form, by means of a method commonly used in the ceramic technique, and sintered to compactness. Excellent results are obtained when the tin oxide and the titanium dioxide are precipitated together, pre-heated to about 1000° C. and ground for working them up further.

Furthermore it has been found that, in sintering to compactness the masses according to the invention, there is no need for taking special measures to prevent the formation of lower oxides, such as is necessary when sintering masses of titanium dioxide and sometimes also mixtures containing titanium dioxide.

For various uses, more particularly for use as a condenser dielectric, insulators having a temperature coefficient of the dielectric constant, which differs only slightly from zero, are of particular importance. These can be obtained in the aforesaid manner by sintering to about 1500° C. with a composition of about 70 mol. per cent of tin oxide and 30 mol. per cent of titanium dioxide. The dielectric constant of such mixtures amounts to about 25.

In Fig. 1 of the accompanying drawing the curve I illustrates the variation of the dielectric constant $\epsilon$ of the aforesaid known sintered masses consisting of $SnO_2$ and $TiO_2$ as a function of their composition. In regard to the products according to the invention higher values of the dielectric constant were measured, as indicated by curve II, with the same composition, which suggests that the known products, in contradistinction to those according to the invention, have not been sintered to compactness.

Fig. 2 illustrates in the same way the variation of the temperature coefficient of the dielectric constant $$\frac{1}{\epsilon}\frac{d\epsilon}{dt}$$

as a function of the composition.

From the drawing it appears that the material sintered to compactness according to the invention has a temperature coefficient of about zero with a dielectric constant of about 25, whereas in the known products, which are not sintered to compactness, this would be the case with a dielectric constant of only about 10.

Finally it is pointed out that ceramic materials, not sintered to compactness, are often electrotechnically unserviceable due to their sensitiveness to moisture. This evidences itself inter alia in the dielectric loss factor, which can be very low solely for products sintered to compactness. The loss factor for products consisting of tin oxide and titanium dioxide according to the invention is generally lower than can be achieved with mixtures of titanium dioxide and cericoxide, since the tan δ .10⁴ thereof is inbetween 1 and 2.

For acting upon the dielectric constant use may be made of admixtures of cericoxide which, similarly to tin oxide, has a positive temperature coefficient, but a higher dielectric constant. Such mixtures permit, for instance, in the case of a temperature coefficient of the dielectric constant being desired which differs only slightly from zero, a dielectric constant to be obtained which varies between about 25 to 35 in accordance with their content of tin oxide and cericoxide. Thus, for instance, according to the invention sintering of a mixture of 17 mol. per cent of titanium dioxide, 60 mol. per cent of cericoxide and 23 mol. per cent of tin oxide at 1290° C. in a current of air, permits the obtainment of a product having a dielectric constant of 33 and a temperature coefficient of the dielectric constant of $-69.10^{-6}$. The loss factor of these materials is generally a little higher; tan δ .10⁴ of the said product is 3.9.

What we claim is:

1. A ceramic insulating material suitable as a dielectric in a capacitor consisting of a compact mass of mixed crystals resulting from sintering a mixture consisting of about 40 to 75 mol. per cent of reactive tin oxide and the balance substantially $TiO_2$.

2. A ceramic insulating material suitable as a dielectric in a capacitor consisting of a compact mass of mixed crystals resulting from sintering a mixture consisting of about 70 mol. per cent of reactive tin oxide and about 30 mol. per cent of $TiO_2$.

3. A method of manufacturing an insulating material suitable for use as a dielectric in a capacitor which comprises the steps of forming a mixture consisting of about 40 to 75 mol. per cent of reactive tin oxide and the balance substantially $TiO_2$, and sintering the mixture at a temperature below 1500° C.

4. A method of manufacturing an insulating material suitable for use as a dielectric in a capacitor which comprises the steps of coprecipitating a mixture consisting of 40 to 75 mol. per cent of reactive tin oxide and the balance substantially $TiO_2$, heating the mixture at a temperature at about 1000° C., and subsequently sintering the mixture at a temperature below 1500° C.

EVERT JOHANNES WILLEM VERWEY.
JOHANNES MARINUS STEVELS.

REFERENCES CITED

The following references are of record in the file of this patent:

UNITED STATES PATENTS

| Number | Name | Date |
|---|---|---|
| 2,027,277 | Habann | Jan. 7, 1936 |
| 2,128,289 | Dubilier et al. | Aug. 30, 1938 |
| 2,399,082 | Wainer | Apr. 23, 1946 |